US011113907B2

(12) United States Patent
Edwards et al.

(10) Patent No.: US 11,113,907 B2
(45) Date of Patent: Sep. 7, 2021

(54) UTILIZING A SHORT-RANGE WIRELESS COMMUNICATION DEVICE TO PROVIDE KEYLESS ACCESS TO A SAFE DEPOSIT BOX

(71) Applicant: Capital One Services, LLC, McLean, VA (US)

(72) Inventors: Joshua Edwards, Philadelphia, PA (US); Abdelkadar M'Hamed Benkreira, Washington, DC (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/656,802

(22) Filed: Oct. 18, 2019

(65) Prior Publication Data

US 2020/0380807 A1    Dec. 3, 2020

Related U.S. Application Data

(63) Continuation of application No. 16/425,109, filed on May 29, 2019, now Pat. No. 10,453,287.

(51) Int. Cl.
*G07C 9/00* (2020.01)
*G07F 19/00* (2006.01)
(Continued)

(52) U.S. Cl.
CPC ......... *G07C 9/00309* (2013.01); *G07C 9/22* (2020.01); *G07F 19/202* (2013.01); *H04W 4/80* (2018.02); *G07C 2009/00325* (2013.01)

(58) Field of Classification Search
CPC ...... G07C 9/00309; G07C 2009/00317; G07C 9/00031; G07C 2009/00325; G07C 2209/14; G07C 2209/08; G07C 9/22; G07C 9/00571; G07C 2009/00793; G07C 9/00912; G07F 19/202; H04W 4/80; H04W 12/08; H04W 12/47; E05B 35/12; Y10T 70/7446; Y10T 70/7458; H04L 63/108; H04L 63/107
(Continued)

(56) References Cited

U.S. PATENT DOCUMENTS 3,976,974 A   8/1976   Hinohara et al.
5,170,431 A   12/1992  Dawson et al.
(Continued)

*Primary Examiner* — Edwin C Holloway, III
(74) *Attorney, Agent, or Firm* — Harrity & Harrity, LLP

(57) ABSTRACT

A device receives, from a short-range wireless communication device associated with a safe deposit box, first data identifying a first transaction card, and identifies a bank employee associated with the first data. The device determines whether the bank employee is authorized to access the safe deposit box, and starts a timer when the bank employee is authorized to access the safe deposit box. The device receives, from the short-range wireless communication device, second data identifying a second transaction card, and determines whether the second data is received prior to an expiration of the timer. The device identifies a customer associated with the second data when the second data is received prior to the expiration of the timer, and determines whether the customer is authorized to access the safe deposit box. The device causes the safe deposit box to be unlocked when the customer is authorized.

20 Claims, 11 Drawing Sheets

(51) Int. Cl.
*H04W 4/80* (2018.01)
*G07C 9/22* (2020.01)

(58) Field of Classification Search
USPC ........................................................ 340/5.73
See application file for complete search history.

(56) References Cited

U.S. PATENT DOCUMENTS

| | | | |
|---|---|---|---|
| 5,475,376 A | 12/1995 | Chikamitue et al. | |
| 5,701,828 A | 12/1997 | Benore et al. | |
| 5,886,634 A * | 3/1999 | Muhme | G08B 13/14 340/572.1 |
| 6,612,142 B1 | 9/2003 | Capwell | |
| 8,479,982 B1 | 7/2013 | Gromley et al. | |
| 9,670,694 B2 | 6/2017 | Larson et al. | |
| 10,453,287 B1 * | 10/2019 | Edwards | G07F 19/202 |
| 2005/0140504 A1 * | 6/2005 | Marshall | G06Q 20/387 340/480 |
| 2006/0178110 A1 * | 8/2006 | Nurminen | A63B 71/0669 455/41.2 |
| 2006/0208063 A1 | 9/2006 | Patel et al. | |
| 2006/0208066 A1 * | 9/2006 | Finn | H04H 60/63 235/380 |
| 2007/0030120 A1 * | 2/2007 | Gusse | G07C 9/22 340/5.61 |
| 2007/0093234 A1 | 4/2007 | Willis et al. | |
| 2008/0252415 A1 * | 10/2008 | Larson | G07C 9/00309 340/5.73 |
| 2010/0237989 A1 * | 9/2010 | Ikegami | G06Q 10/087 340/5.61 |
| 2011/0068922 A1 * | 3/2011 | Ross | G06Q 10/087 340/572.1 |
| 2016/0163137 A1 * | 6/2016 | Strulovitch | G07C 9/28 340/5.61 |

* cited by examiner

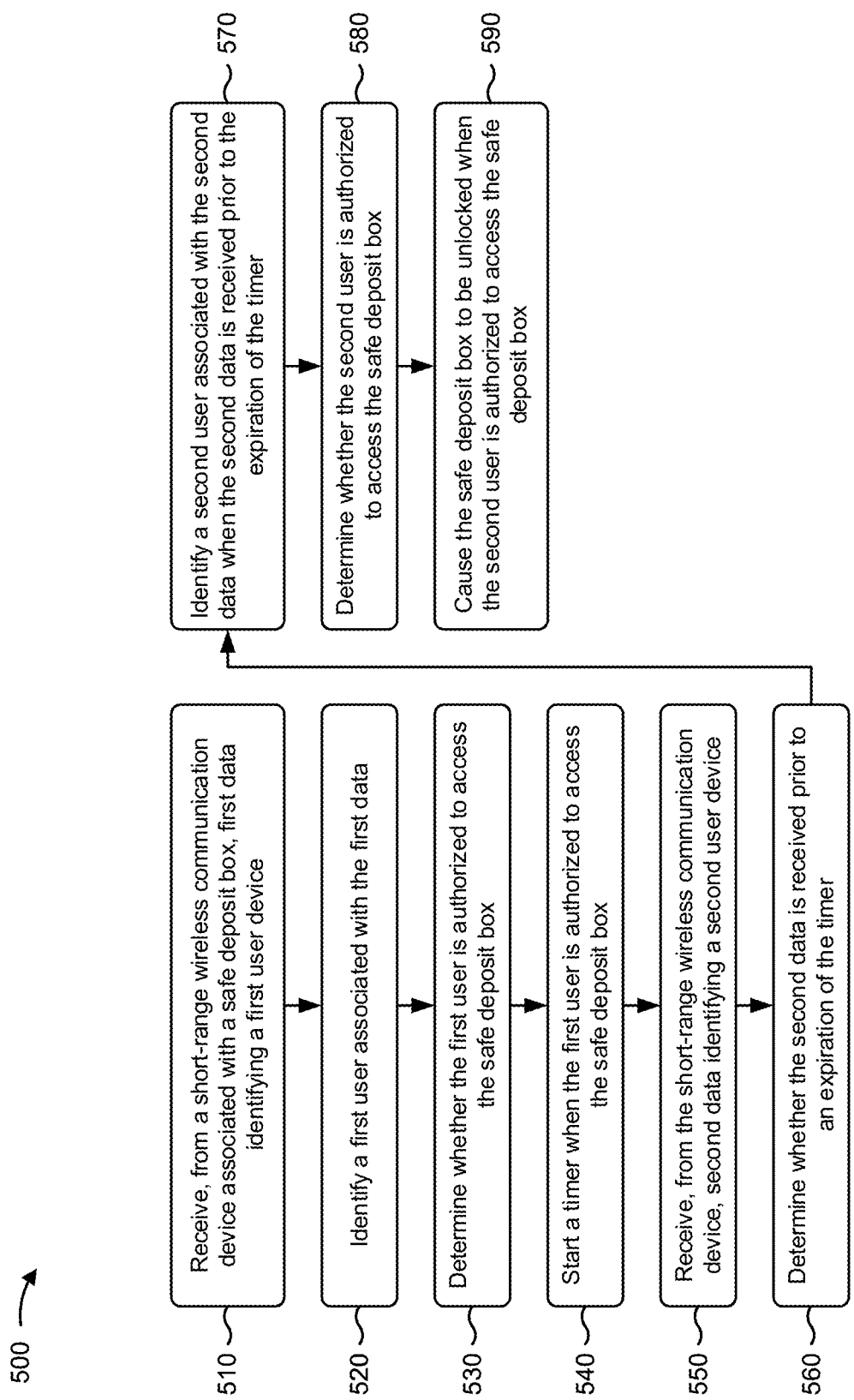

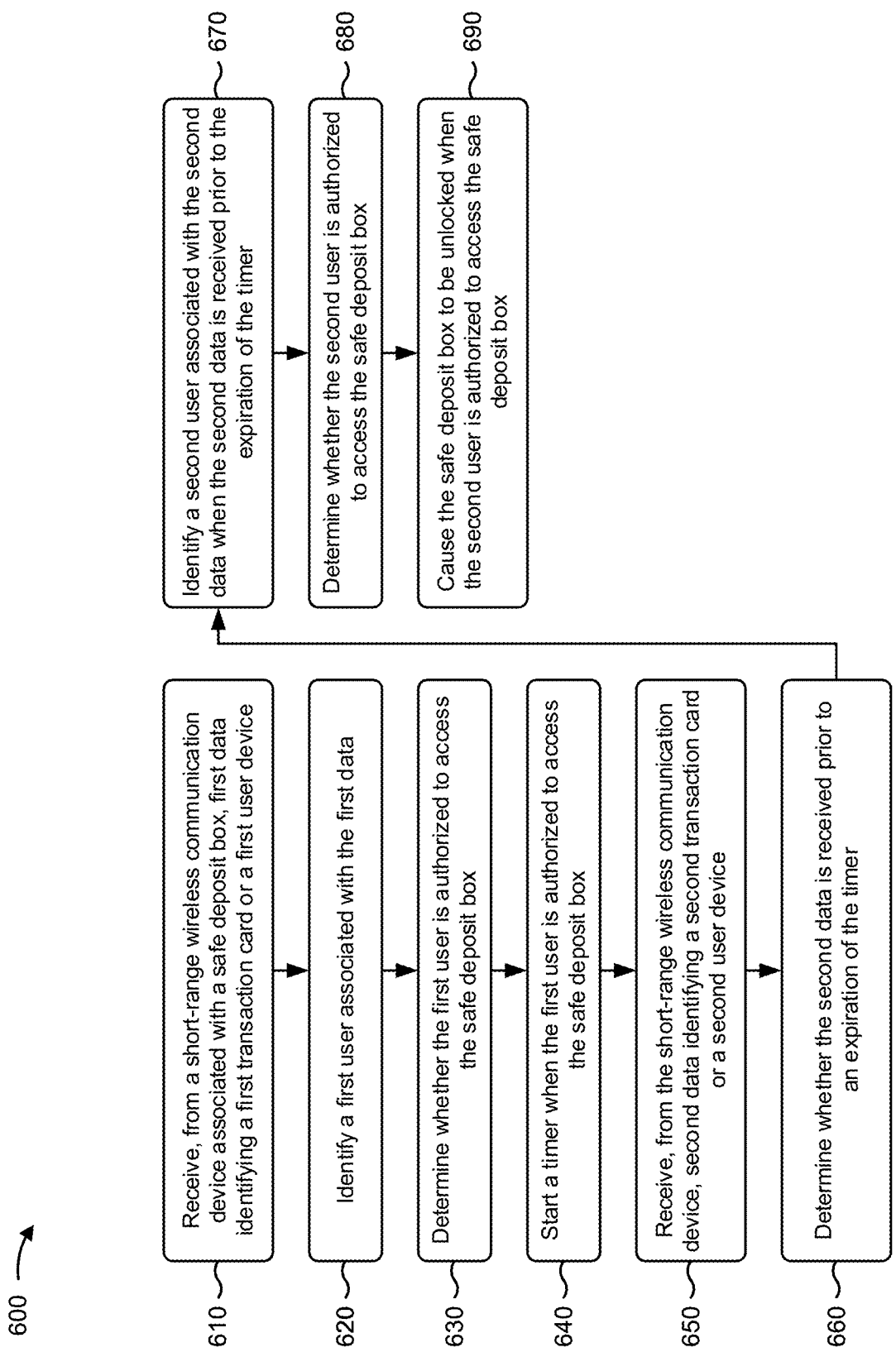

UTILIZING A SHORT-RANGE WIRELESS COMMUNICATION DEVICE TO PROVIDE KEYLESS ACCESS TO A SAFE DEPOSIT BOX

RELATED APPLICATION

This application is a continuation of U.S. patent application Ser. No. 16/425,109, filed May 29, 2019 (now U.S. Pat. No. 10,453,287), which is incorporated herein by reference.

BACKGROUND

A safe deposit box, also known as a safety deposit box, is an individually secured container, usually held within a larger safe or bank vault. Safe deposit boxes are generally located in banks, post offices, or other institutions. Safe deposit boxes are used to store valuable possessions, such as gemstones, precious metals, currency, marketable securities, luxury goods, important documents (e.g., wills, property deeds, or birth certificates), computer data that need protection from theft, fire, flood, tampering, or other perils, and/or the like.

SUMMARY

According to some implementations, a method may include receiving, from a short-range wireless communication device associated with a safe deposit box, first data identifying a first transaction card, and identifying a bank employee associated with the first data. The method may include determining whether the bank employee is authorized to access the safe deposit box, and starting a timer when the bank employee is authorized to access the safe deposit box. The method may include receiving, from the short-range wireless communication device, second data identifying a second transaction card, and determining whether the second data is received prior to an expiration of the timer. The method may include identifying a customer associated with the second data when the second data is received prior to the expiration of the timer, and determining whether the customer is authorized to access the safe deposit box. The method may include causing the safe deposit box to be unlocked when the customer is authorized to access the safe deposit box.

According to some implementations, a device may include one or more memories, and one or more processors, communicatively coupled to the one or more memories, to receive, from a short-range wireless communication device associated with a safe deposit box, first data identifying a first user device, and identify a first user associated with the first data. The one or more processors may determine whether the first user is authorized to access the safe deposit box, and may start a timer when the first user is authorized to access the safe deposit box. The one or more processors may receive, from the short-range wireless communication device, second data identifying a second user device, and may determine whether the second data is received prior to an expiration of the timer. The one or more processors may identify a second user associated with the second data when the second data is received prior to the expiration of the timer, and may determine whether the second user is authorized to access the safe deposit box. The one or more processors may cause the safe deposit box to be unlocked when the second user is authorized to access the safe deposit box.

According to some implementations, a non-transitory computer-readable medium may store instructions that include one or more instructions that, when executed by one or more processors of a device, cause the one or more processors to receive, from a short-range wireless communication device associated with a safe deposit box, first data identifying a first transaction card or a first user device, and identify a first user associated with the first data. The one or more instructions may cause the one or more processors to determine whether the first user is authorized to access the safe deposit box, and start a timer when the first user is authorized to access the safe deposit box. The one or more instructions may cause the one or more processors to receive, from the short-range wireless communication device, second data identifying a second transaction card or a second user device, and determine whether the second data is received prior to an expiration of the timer. The one or more instructions may cause the one or more processors to identify a second user associated with the second data when the second data is received prior to the expiration of the timer, and determine whether the second user is authorized to access the safe deposit box. The one or more instructions may cause the one or more processors to cause the safe deposit box to be unlocked when the second user is authorized to access the safe deposit box.

BRIEF DESCRIPTION OF THE DRAWINGS

FIGS. 4-6 are flow charts of example processes for utilizing a short-range wireless communication device to provide keyless access to a safe deposit box.

DETAILED DESCRIPTION

Figure 1A:
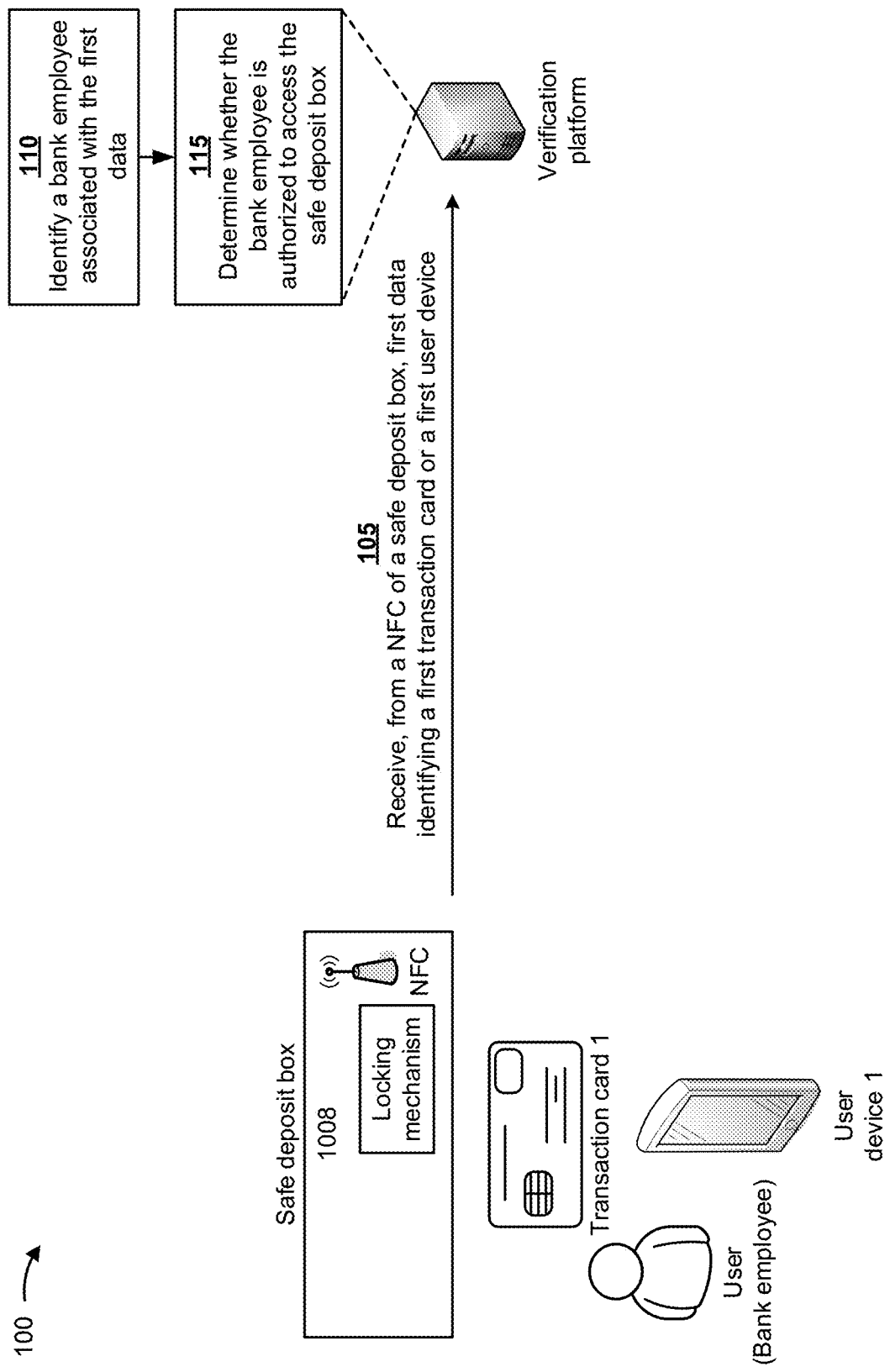
FIGS. 1A-1F are diagrams of one or more example implementations described herein.
Figure 1B:
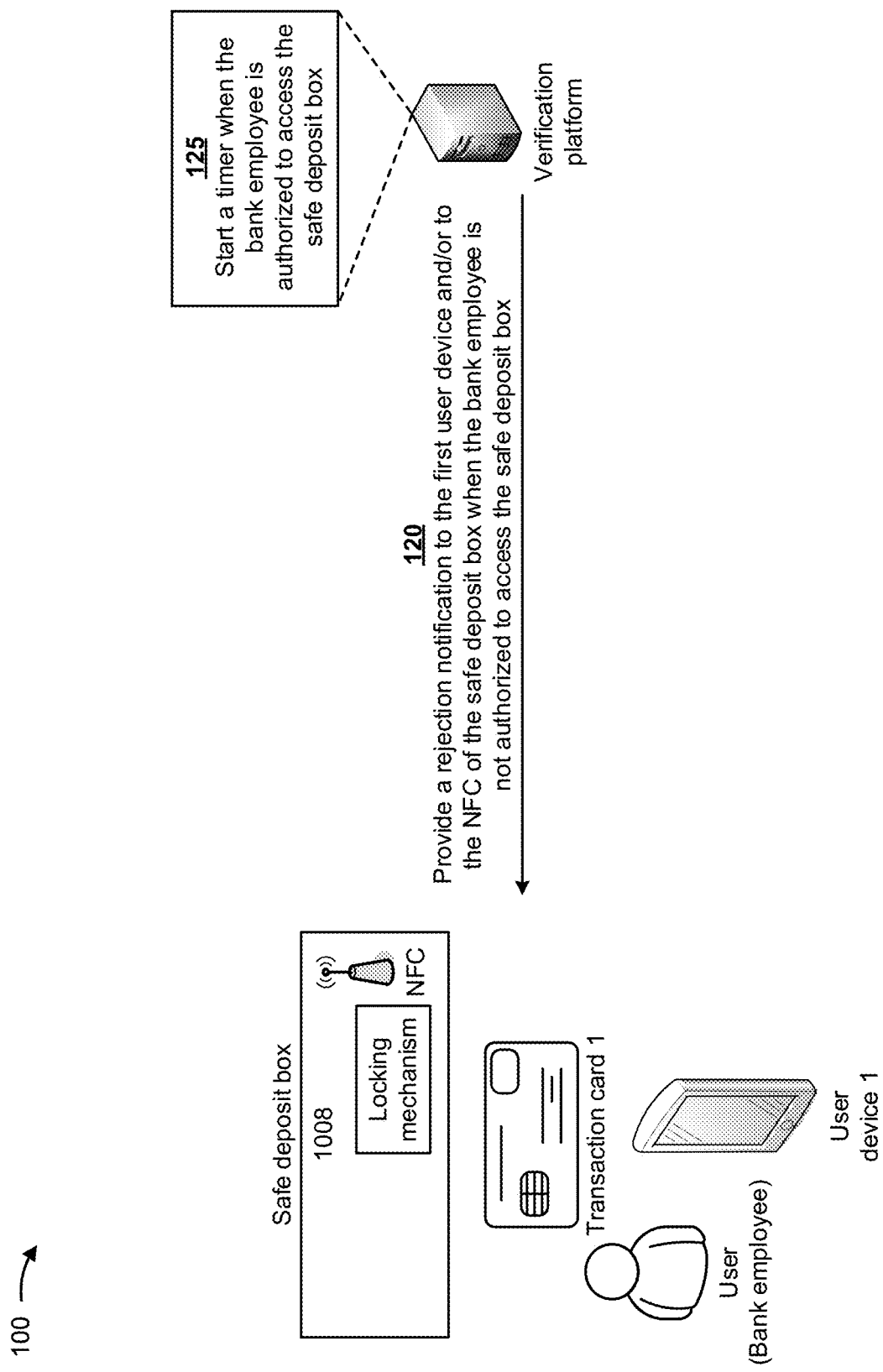

The following detailed description of example implementations refers to the accompanying drawings. The same reference numbers in different drawings may identify the same or similar elements.

In order to access a safe deposit box, an owner of the safe deposit box (e.g., a customer of a bank) may request a bank employee to assist the customer. The bank employee typically needs to open a bank vault containing the safe deposit box and sign a ledger before attempting to access the safe deposit box. The safe deposit box includes a first lock to be unlocked with a key possessed by the customer and a second lock to be unlocked with a key possessed by the bank employee. Thus, the customer and the bank employee need to utilize their respective keys to unlock the first lock and the second lock. Once the safe deposit box is unlocked, the customer may access the contents of the safe deposit box.

Accessing a safe deposit box is time consuming and inconvenient for the customer and the bank employee. Both need to ensure they possess their respective keys to unlock the safe deposit box, which may require time and effort to locate the keys. Furthermore, the bank employee is taken away from other tasks to assist in opening the safe deposit box. This may require the bank employee to repeatedly start and stop tasks, which may waste computing resources (e.g., processing resources, memory resources, and/or the like) and/or network resources associated with performing the tasks.

Some implementations described herein provide a verification platform that utilizes a short-range wireless communication device to provide keyless access to a safe deposit box. For example, the verification platform may receive, from a short-range wireless communication device associated with a safe deposit box, first data identifying a first transaction card, and may identify a bank employee associated with the first data. The verification platform may determine whether the bank employee is authorized to access the safe deposit box, and may start a timer when the bank employee is authorized to access the safe deposit box. The verification platform may receive, from the short-range wireless communication device, second data identifying a second transaction card, and may determine whether the second data is received prior to an expiration of the timer. The verification platform may identify a customer associated with the second data when the second data is received prior to the expiration of the timer, and may determine whether the customer is authorized to access the safe deposit box. The verification platform may cause the safe deposit box to be unlocked when the customer is authorized to access the safe deposit box.

In this way, the verification platform enables a customer and a bank employee to access a safe deposit box with an item (e.g., a transaction card, a user device, and/or the like) that is always available to the customer and the bank employee. This reduces the time required to access the safe deposit box and provides a more convenient experience for the customer and the bank employee. Furthermore, the bank employee does not repeatedly start and stop tasks, which conserves computing resources (e.g., processing resources, memory resources, and/or the like) and/or network resources that would otherwise be wasted with starting and stopping the tasks.

FIGS. 1A-1F are diagrams of one or more example implementations 100 described herein. As shown in FIG. 1A, a first user device (e.g., user device 1) may be associated with a safe deposit box, a verification platform, a first user (e.g., a bank employee), and a first transaction card (e.g., transaction card 1). As further shown, the safe deposit box may include a locking mechanism and a short-range wireless communication device. In some implementations, the locking mechanism may include an electromagnetic lock, an electronically-controlled mechanical lock, and/or the like. In some implementations, the short-range wireless communication device may include a near-field communication (NFC) device, a Bluetooth device, an infrared device, an ultraband device, a Zigbee device, and/or the like. In some implementations, the short-range wireless communication device may be embedded within the safe deposit box, may be within a vicinity of the safe deposit box, may communicate either wirelessly or through a wire, and/or the like. In some implementations, the first transaction card may include a card authorizing the first user to access one or more safe deposit boxes located at a bank employing the first user. In some implementations, the first user device may include an application authorizing the first user to access the one or more safe deposit boxes located at the bank.

The first user may utilize the first transaction card or the first user device to communicate with the short-range wireless communication device of the safe deposit box. In some implementations, when the first user gets close enough to the safe deposit box (e.g., within communication range of the short-range wireless communication device associated with the safe deposit box), the first transaction card or the first user device may communicate with the short-range wireless communication device associated with the safe deposit box. When the first transaction card or the first user device communicates with the short-range wireless communication device, the short-range wireless communication device may provide, to the verification platform, first data identifying the first transaction card or the first user device.

As further shown in FIG. 1A, and by reference number 105, the verification platform may receive, from the short-range wireless communication device of the safe deposit box, the first data identifying the first transaction card or the first user device. In some implementations, the first data may include data identifying the first transaction card (e.g., an identification number of the first transaction card); the first user (e.g., a name, an employee identifier, etc. of the first user); the one or more safe deposit boxes the first user is permitted to access (e.g., identification numbers of the safe deposit boxes, such as "1008" as shown in FIG. 1A); the first user device (e.g., a telephone number of the first user device, device identifier, etc.); and/or the like.

As further shown in FIG. 1A, and by reference number 110, the verification platform may identify a bank employee (e.g., the first user) associated with the first data. In some implementations, the verification platform may store, in a data structure (e.g., a database, a table, a list, and/or the like) associated with the verification platform, information identifying bank employees that are employed by the bank, transactions cards associated with the bank employees, user devices associated with the bank employees, and/or the like. The verification platform may compare the first data and the information identifying the bank employees, the transaction cards, and the user devices to identify the first user associated with the first data (e.g., based on matching the first data identifying the first transaction card or the first user device with a transaction card or a user device included in the information identifying the bank employees, the transaction cards, and the user devices).

As further shown in FIG. 1A, and by reference number 115, the verification platform may determine whether the bank employee (e.g., the first user) is authorized to access the safe deposit box. In some implementations, the verification platform may store, in the data structure, information identifying bank employees that are employed by the bank and safe deposit boxes the bank employees are authorized to access. The verification platform may compare information identifying the bank employee (e.g., the first user) and the information identifying the bank employees and the safe deposit boxes to determine whether the first user is authorized to access the safe deposit box (e.g., based on matching the information identifying first user with information identifying the safe deposit box).

In some implementations, the verification platform may determine that the first user (e.g., the bank employee) is not authorized to access the safe deposit box when the data structure does not include information indicating that the first user is authorized to access the safe deposit box. In such implementations, and as shown by reference number 120 in FIG. 1B, the verification platform may provide a rejection notification to the first user device and/or to the short-range wireless communication device of the safe deposit box when the bank employee (e.g., the first user) is not authorized to access the safe deposit box. In some implementations, the rejection notification may indicate that the bank employee is not authorized to access the safe deposit box. In some implementations, the first user device may display the rejection notification to the first user. In some implementations, the safe deposit box may include a display component and the short-range wireless communication device may cause the display component to display the rejection notification. The first user may then request another bank employee (e.g., authorized to access the safe deposit box) to handle accessing the safe deposit box.

In some implementations, the verification platform may determine that the first user (e.g., the bank employee) is authorized to access the safe deposit box when the data structure includes information indicating that the first user is authorized to access the safe deposit box. In such implementations, and as shown by reference number 125 in FIG. 1B, the verification platform may start a timer when the bank employee (e.g., the first user) is authorized to access the safe deposit box. The timer may be associated with determining when a second user (e.g., a customer and an owner of the safe deposit box) causes a second transaction card or a second user device to communicate with the short-range wireless communication device (e.g., the second user should cause the communication prior to expiration of the timer), as described below.

Figure 1C:
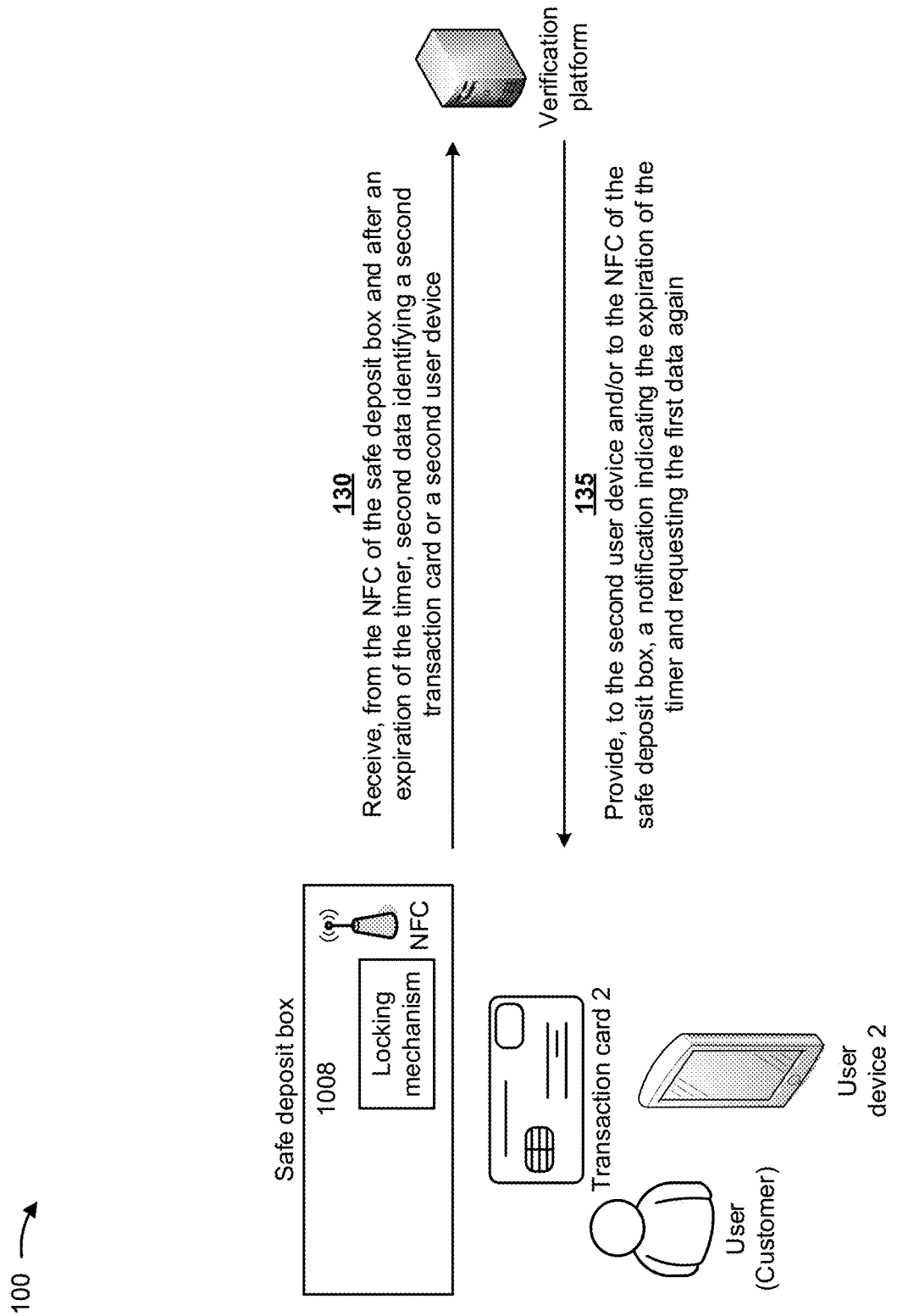

As shown in FIG. 1C, a second user device (e.g., user device 2) may be associated with the safe deposit box, the verification platform, a second user (e.g., a customer and the owner of the safe deposit box), and a second transaction card (e.g., transaction card 2). In some implementations, the second transaction card may include a credit card, a debit card, a gift card, an automated teller machine (ATM) card, a rewards card, a client loyalty card, a card authorizing the second user to access the safe deposit box, and/or the like. In some implementations, the second user device may include an application associated with the second transaction card, authorizing the second user to access the safe deposit box, and/or the like.

The second user may utilize the second transaction card or the second user device to communicate with the short-range wireless communication device of the safe deposit box. In some implementations, when the second user gets close enough to the safe deposit box (e.g., within communication range of the short-range wireless communication device associated with the safe deposit box), the second transaction card or the second user device may communicate with the short-range wireless communication device associated with the safe deposit box. When the second transaction card or the second user device communicates with the short-range wireless communication device, the short-range wireless communication device may provide, to the verification platform, second data identifying the second transaction card or the second user device.

In some implementations, and as further shown by reference number 130 in FIG. 1C, the verification platform may receive, from the short-range wireless communication device of the safe deposit box and after expiration of the timer (e.g., in seconds, minutes, etc.), the second data identifying the second transaction card or the second user device. In some implementations, the second data may include data identifying the second transaction card (e.g., an identification number of the second transaction card); the second user (e.g., a name, an account, etc. of the second user); the safe deposit box the second user is permitted to access (e.g., the identification number of the safe deposit box, such as "1008"); the second user device (e.g., a telephone number of the second user device, device identifier, etc.); and/or the like.

As further shown in FIG. 1C, and by reference number 135, the verification platform may provide, to the second user device, the short-range wireless communication device, and/or the first user device (not shown), a notification indicating the expiration of the timer and requesting the first data again. In some implementations, the notification may indicate that the customer did not cause the communication between the short-range wireless communication device and the second transaction card and/or the second user device within a predetermined time period (e.g., in seconds, minutes, etc.) and may request that the first user provide the first data again. In some implementations, the first user device may display the notification to the first user and the second user device may display the notification to the second user. In some implementations, the short-range wireless communication device may cause the display component of the safe deposit box to display the notification. The first user may then repeat the process described above in connection with FIG. 1A.

Figure 1D:
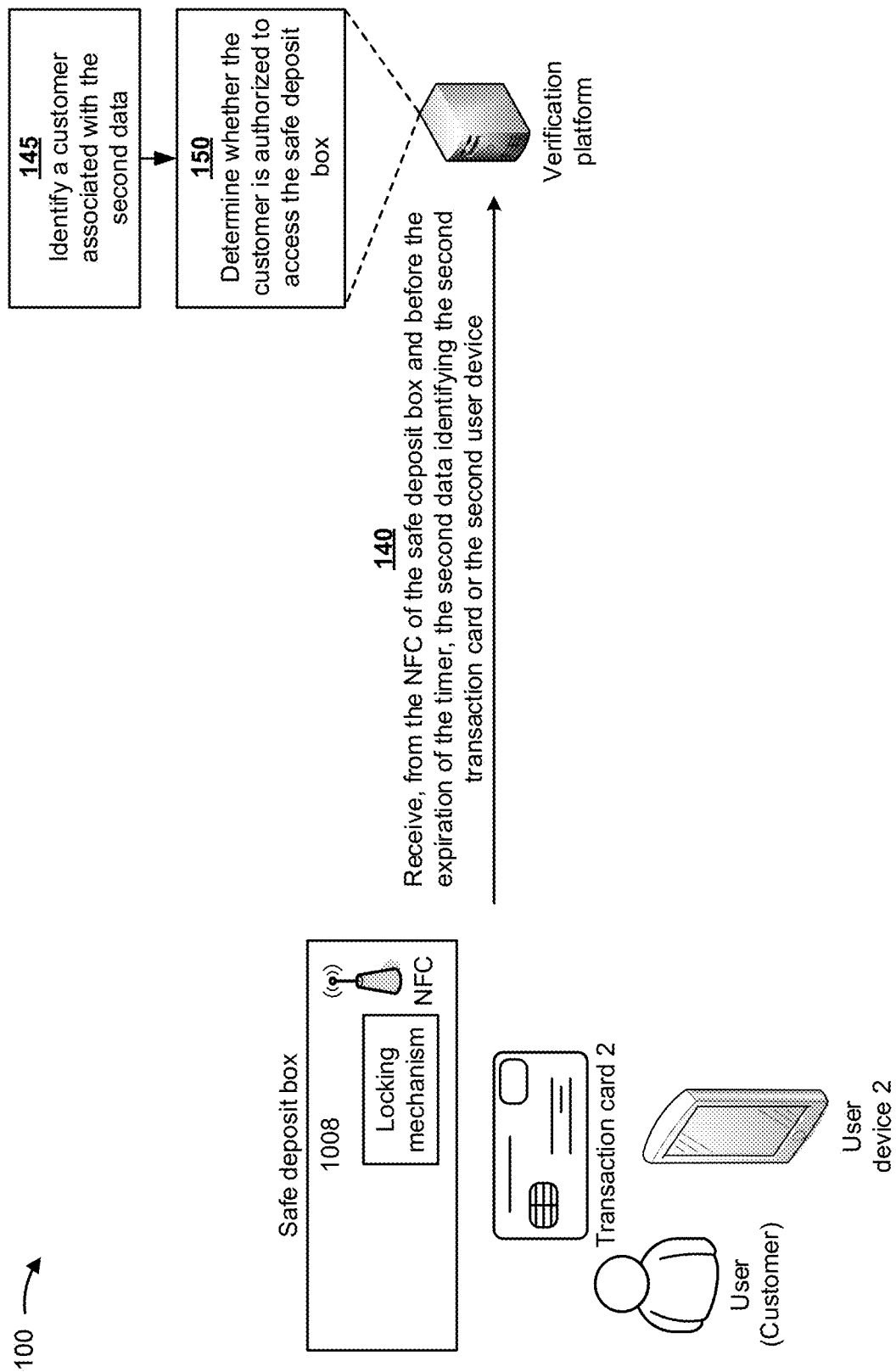
Figure 1E:
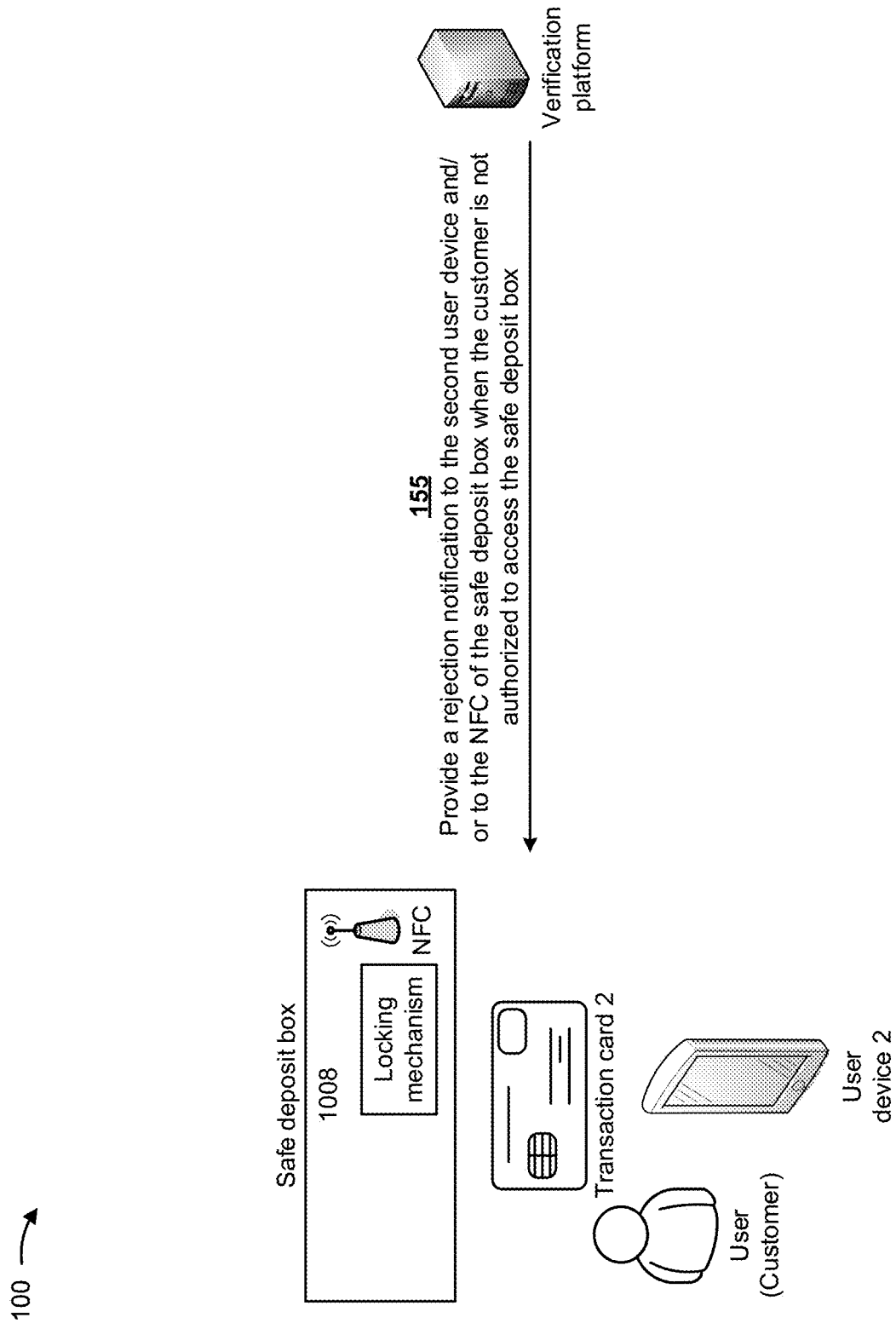

In some implementations, and as shown by reference number 140 in FIG. 1D, the verification platform may receive, from the short-range wireless communication device of the safe deposit box and before the expiration of the timer, the second data identifying the second transaction card or the second user device. As further shown in FIG. 1D, and by reference number 145, the verification platform may identify a customer (e.g., the second user) associated with the second data. In some implementations, the verification platform may store, in the data structure associated with the verification platform, information identifying customers that are associated with safe deposit boxes at the bank, transactions cards associated with the customers, user devices associated with the customers, and/or the like. The verification platform may compare the second data and the information identifying the customers, the transaction cards, and the user devices to identify the second user associated with the second data (e.g., based on matching the second data identifying the second transaction card or the second user device with a transaction card or a user device included in the information identifying the customers, the transaction cards, and the user devices).

As further shown in FIG. 1D, and by reference number 150, the verification platform may determine whether the customer (e.g., the second user) is authorized to access the safe deposit box. In some implementations, the verification platform may store, in the data structure, information identifying customers that are associated with safe deposit boxes at the bank and safe deposit boxes the customers are authorized to access. The verification platform may compare information identifying the customer (e.g., the second user) and the information identifying the customers and the safe deposit boxes to determine whether the second user is authorized to access the safe deposit box (e.g., based on matching the information identifying second user with information identifying the safe deposit box).

In some implementations, the verification platform may determine that the second user (e.g., the customer) is not authorized to access the safe deposit box when the data structure does not include information indicating that the second user is authorized to access the safe deposit box. In such implementations, and as shown by reference number 155 in FIG. 1E, the verification platform may provide a rejection notification to the first user device (not shown), the second user device, and/or to the short-range wireless communication device of the safe deposit box when the customer (e.g., the second user) is not authorized to access the safe deposit box. In some implementations, the rejection notification may indicate that the customer is not authorized to access the safe deposit box. In some implementations, the first user device may display the rejection notification to the first user and the second user device may display the rejection notification to the second user. In some implementations, the short-range wireless communication device may cause the display component of the safe deposit box to display the rejection notification. The first user may then prevent the second user from attempting to further access the safe deposit box or may request that the second user reperform the process described above in connection with FIG. 1D.

In some implementations, the verification platform may determine that the second user (e.g., the customer) is authorized to access the safe deposit box when the data structure includes information indicating that the second user is authorized to access the safe deposit box. In such implementations, and as shown by reference number 160 in FIG. 1F, the verification platform may cause the safe deposit box to be unlocked when the customer is authorized to access the safe deposit box. In some implementations, the verification platform may provide, to the short-range wireless communication device, an instruction instructing the short-range wireless communication device to cause the locking mechanism (e.g., the electromagnetic lock, the electronically-controlled mechanical lock, and/or the like) to be unlocked. The short-range wireless communication device may cause the locking mechanism to be unlocked based on the instruction. The second user may open the safe deposit box and access contents of the safe deposit box.

Figure 1F:
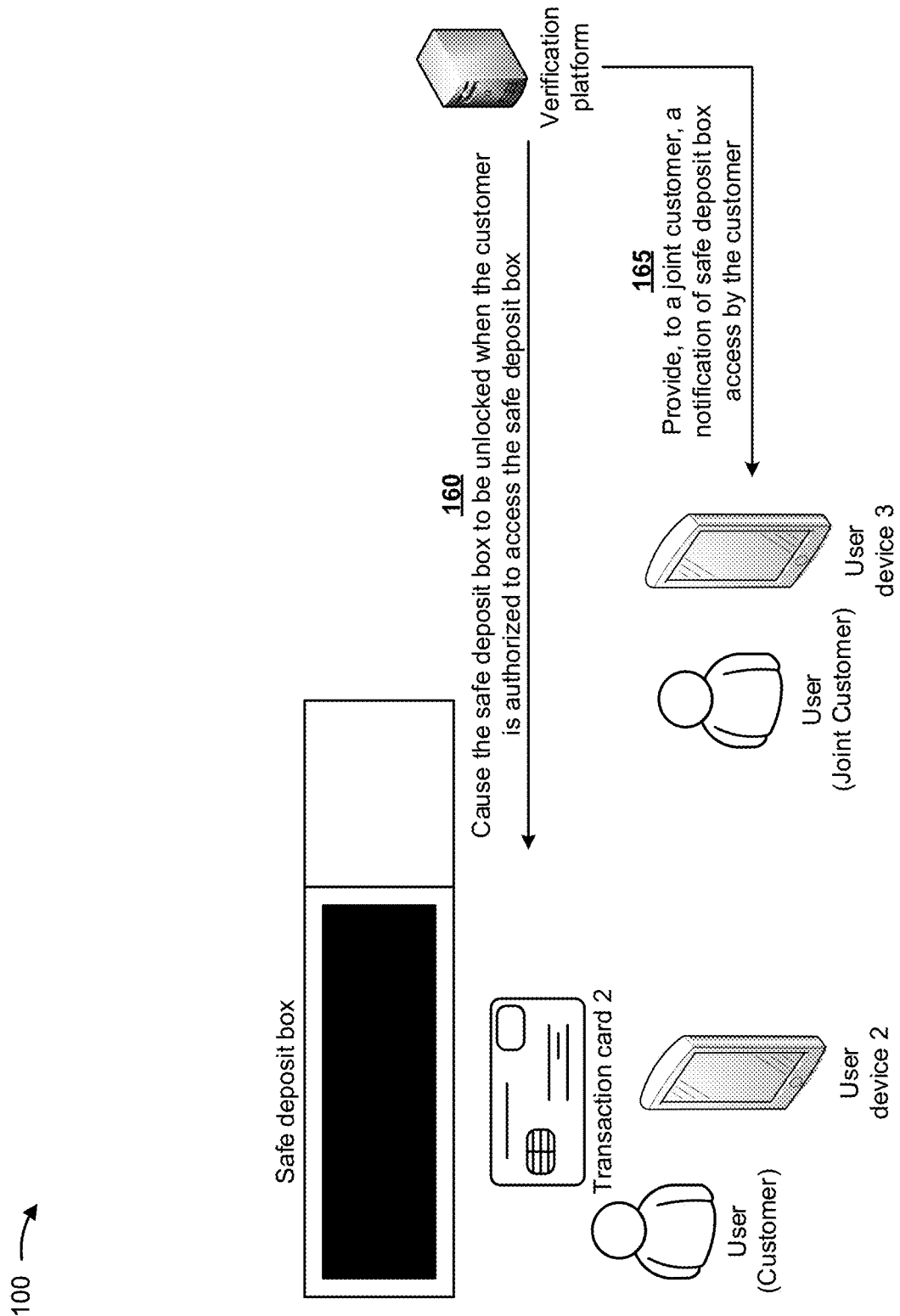

As further shown in FIG. 1F, and by reference number 165, the verification platform may provide, to a user device associated with a joint customer (e.g., another customer authorized to access the safe deposit box, such as, for example, a sibling, a husband, a wife, etc.) of the customer, a notification indicating that the safe deposit box is being accessed by the customer. In some implementations, the verification platform may require the joint customer to approve the access of the safe deposit box before unlocking the safe deposit box for the customer.

In some implementations, the verification platform may determine, based on causing the safe deposit box to be unlocked, whether one or more additional customers are associated with the safe deposit box, and may obtain, from the data structure and when the one or more additional customers are determined to be associated with the safe deposit box, information identifying the one or more additional customers. The verification platform may identify one or more additional customers based on information identifying the safe deposit box. The verification platform may identify, in the data structure and based on identifying the one or more additional customers, one or more user devices associated with the one or more additional customers, and may provide, to each user device of the one or more user devices associated with the one or more additional customers, a notification indicating that the customer is accessing the safe deposit box.

In some implementations, the verification platform may determine, based on determining that the customer is authorized to access the safe deposit box and before causing the safe deposit box to be unlocked, whether one or more additional customers are associated with the safe deposit box. The verification platform may obtain, from the data structure and when the one or more additional customers are determined to be associated with the safe deposit box, information identifying the one or more additional customers. The verification platform may identify the one or more additional customers based on information identifying the safe deposit box. The verification platform may identify, in the data structure and based on identifying the one or more additional customers, one or more user devices associated with the one or more additional customers, and may provide, to each user device of the one or more user devices associated with the one or more additional customers, a request to permit the customer to access the safe deposit box. In such implementations, the verification may cause the safe deposit box to be unlocked based on determining that the customer is authorized to access the safe deposit box, and receiving permission, from each user device of the one or more user devices associated with the one or more additional customers, for the customer to access the safe deposit box.

Although implementations are described herein in connection with a safe deposit box, the techniques described herein may be utilized with other secure devices, secure areas, and/or the like. For example, implementations described herein may be utilized with a bank safe, a home safe, a safe area in a building (e.g., classified areas of a building or a location), and any other locations where access may be restricted (e.g., to access a classified room may require an employee transaction card and a supervisor transaction card).

In this way, several different stages of the process for utilizing a short-range wireless communication device to provide keyless access to a safe deposit box may be automated, which may improve speed and efficiency of the process and conserve computing resources (e.g., processing resources, memory resources, and/or the like). Furthermore, implementations described herein integrate technology into a safe deposit box to increase security relating to accessing the safe deposit box. Further, a process for utilizing a short-range wireless communication device to provide keyless access to a safe deposit box conserves computing resources (e.g., processing resources, memory resources, and/or the like) that would otherwise be wasted by bank employees repeatedly starting and stopping tasks to manage access to safe deposit boxes.

As indicated above, FIGS. 1A-1F are provided merely as examples. Other examples may differ from what is described with regard to FIGS. 1A-1F.

Figure 2:
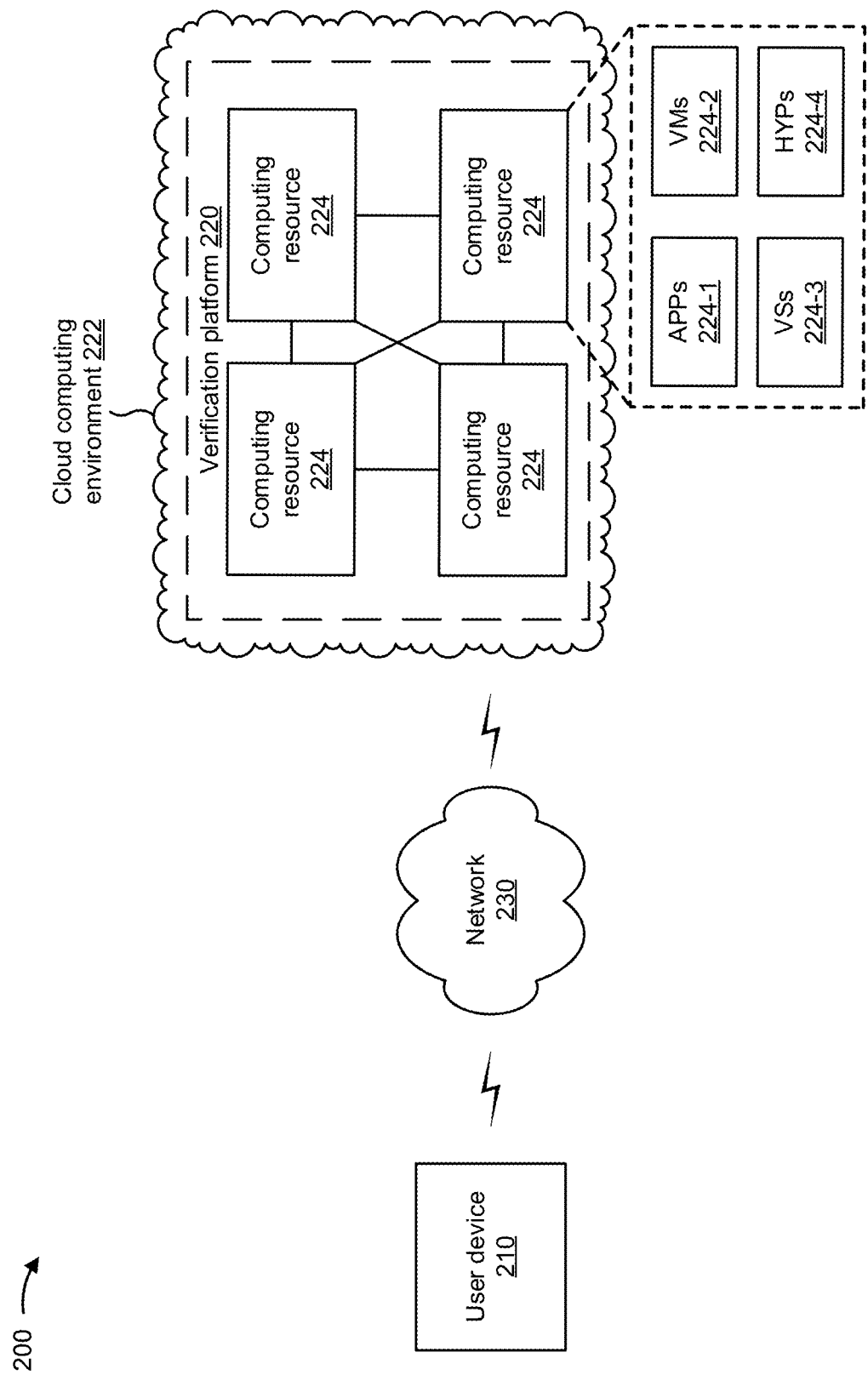
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a user device 210, a verification platform 220, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to verification platform 220.

Verification platform 220 includes one or more devices that may utilize a short-range wireless communication device to provide keyless access to a safe deposit box. In some implementations, verification platform 220 may be modular such that certain software components may be swapped in or out depending on a particular need. As such, verification platform 220 may be easily and/or quickly reconfigured for different uses. In some implementations, verification platform 220 may receive information from and/or transmit information to one or more user devices 210.

In some implementations, as shown, verification platform 220 may be hosted in a cloud computing environment 222. Notably, while implementations described herein describe verification platform 220 as being hosted in cloud computing environment 222, in some implementations, verification platform 220 may be non-cloud-based (i.e., may be implemented outside of a cloud computing environment) or may be partially cloud-based.

Cloud computing environment 222 includes an environment that may host verification platform 220. Cloud computing environment 222 may provide computation, software, data access, storage, etc. services that do not require end-user knowledge of a physical location and configuration of system(s) and/or device(s) that host verification platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host verification platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with verification platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of user device 210 or an operator of verification platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may provide administrators of the storage system with flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device and/or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
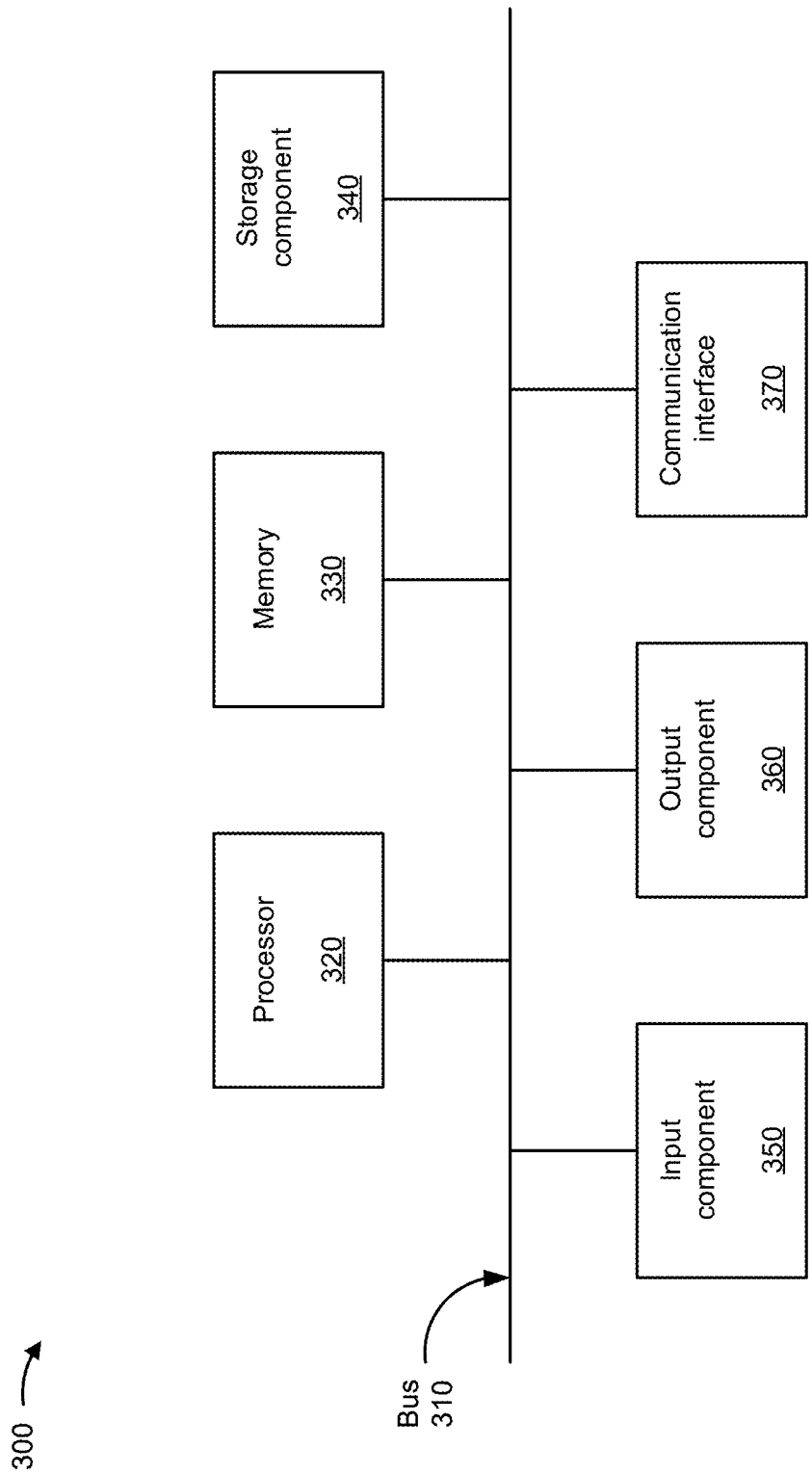
FIG. 3 is a diagram of example components of one or more devices of FIG. 2.

FIG. 3 is a diagram of example components of a device 300. Device 300 may correspond to user device 210, verification platform 220, and/or computing resource 224. In some implementations, user device 210, verification platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
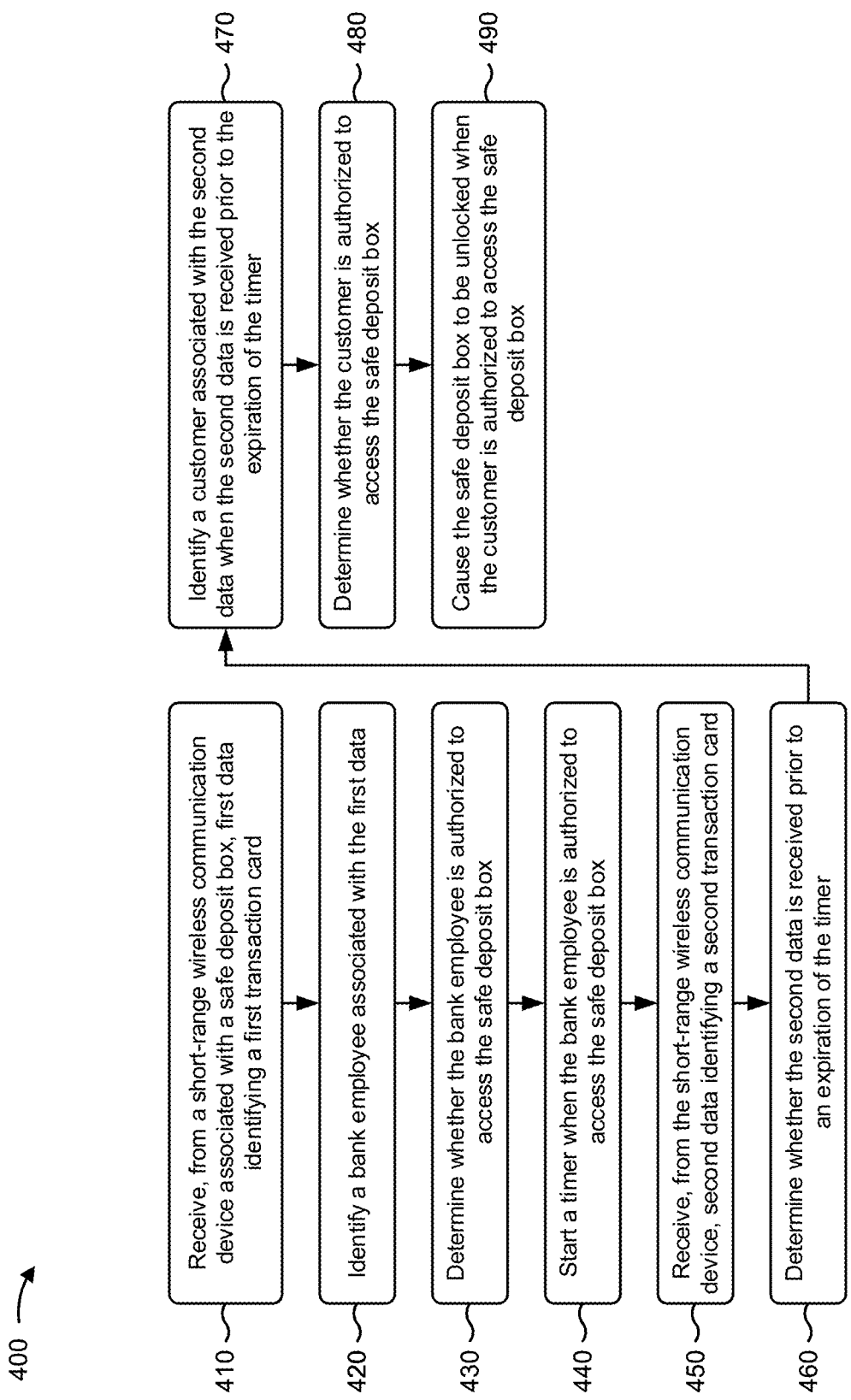

FIG. 4 is a flow chart of an example process 400 for utilizing a short-range wireless communication device to provide keyless access to a safe deposit box. In some implementations, one or more process blocks of FIG. 4 may be performed by a verification platform (e.g., verification platform 220). In some implementations, one or more process blocks of FIG. 4 may be performed by another device or a group of devices separate from or including the verification platform, such as a user device (e.g., user device 210).

As shown in FIG. 4, process 400 may include receiving, from a short-range wireless communication device associated with a safe deposit box, first data identifying a first transaction card (block 410). For example, the verification platform (e.g., using computing resource 224, processor 320, communication interface 370, and/or the like) may receive, from a short-range wireless communication device associated with a safe deposit box, first data identifying a first transaction card, as described above in connection with FIGS. 1A-2.

As further shown in FIG. 4, process 400 may include identifying a bank employee associated with the first data (block 420). For example, the verification platform (e.g., using computing resource 224, processor 320, memory 330, and/or the like) may identify a bank employee associated with the first data, as described above in connection with FIGS. 1A-2.

As further shown in FIG. 4, process 400 may include determining whether the bank employee is authorized to access the safe deposit box (block 430). For example, the verification platform (e.g., using computing resource 224, processor 320, storage component 340, and/or the like) may determine whether the bank employee is authorized to access the safe deposit box, as described above in connection with FIGS. 1A-2.

As further shown in FIG. 4, process 400 may include starting a timer when the bank employee is authorized to access the safe deposit box (block 440). For example, the verification platform (e.g., using computing resource 224, processor 320, memory 330, and/or the like) may start a timer when the bank employee is authorized to access the safe deposit box, as described above in connection with FIGS. 1A-2.

As further shown in FIG. 4, process 400 may include receiving, from the short-range wireless communication device, second data identifying a second transaction card (block 450). For example, the verification platform (e.g., using computing resource 224, processor 320, communication interface 370, and/or the like) may receive, from the short-range wireless communication device, second data identifying a second transaction card, as described above in connection with FIGS. 1A-2.

As further shown in FIG. 4, process 400 may include determining whether the second data is received prior to an expiration of the timer (block 460). For example, the verification platform (e.g., using computing resource 224, processor 320, memory 330, communication interface 370, and/or the like) may determine whether the second data is received prior to an expiration of the timer, as described above in connection with FIGS. 1A-2.

As further shown in FIG. 4, process 400 may include identifying a customer associated with the second data when the second data is received prior to the expiration of the timer (block 470). For example, the verification platform (e.g., using computing resource 224, processor 320, storage component 340, and/or the like) may identify a customer associated with the second data when the second data is received prior to the expiration of the timer, as described above in connection with FIGS. 1A-2.

As further shown in FIG. 4, process 400 may include determining whether the customer is authorized to access the safe deposit box (block 480). For example, the verification platform (e.g., using computing resource 224, processor 320, memory 330, and/or the like) may determine whether the customer is authorized to access the safe deposit box, as described above in connection with FIGS. 1A-2.

As further shown in FIG. 4, process 400 may include causing the safe deposit box to be unlocked when the customer is authorized to access the safe deposit box (block 490). For example, the verification platform (e.g., using computing resource 224, processor 320, memory 330, communication interface 370, and/or the like) may cause the safe deposit box to be unlocked when the customer is authorized to access the safe deposit box, as described above in connection with FIGS. 1A-2.

Process 400 may include additional implementations, such as any single implementation or any combination of implementations described below and/or described with regard to any other process described herein.

In some implementations, the verification platform may provide a rejection notification to a user device associated with a supervisor of the bank employee when the bank employee is not authorized to access the safe deposit box. In some implementations, the verification platform may provide, to user devices associated with the customer and the bank employee, a notification indicating the expiration of the timer and requesting the first data again, where the notification is provided when the second data is received after the expiration of the timer.

In some implementations, the verification platform may determine, based on causing the safe deposit box to be unlocked, whether one or more additional customers are associated with the safe deposit box, and may obtain, when the one or more additional customers are determined to be associated with the safe deposit box, information identifying the one or more additional customers, the one or more additional customers being identified based on information identifying the safe deposit box. Additionally, the verification platform may identify, based on identifying the one or more additional customers associated with the safe deposit box, one or more user devices associated with the one or more additional customers, and may provide, to each user device of the one or more user devices associated with the one or more additional customers, a notification indicating that the customer is accessing the safe deposit box.

In some implementations, the verification platform may determine, based on determining that the customer is authorized to access the safe deposit box and before causing the safe deposit box to be unlocked, whether one or more additional customers are associated with the safe deposit box, and may obtain, when the one or more additional customers are determined to be associated with the safe deposit box, information identifying the one or more additional customers, the one or more additional customers being identified based on information identifying the safe deposit box. Additionally, the verification platform may identify, based on identifying the one or more additional customers associated with the safe deposit box, one or more user devices associated with the one or more additional customers, and may provide, to each user device of the one or more user devices associated with the one or more additional customers, a request to permit the customer to access the safe deposit box. Additionally, when causing the safe deposit box to be unlocked, the verification platform may cause the safe deposit box to be unlocked based on: determining that the customer is authorized to access the safe deposit box, and receiving permission, from each user device of the one or more user devices associated with the one or more additional customers, for the customer to access the safe deposit box.

In some implementations, the short-range wireless communication device may include a near-field communication (NFC) device. In some implementations, the safe deposit box may include one of an electromagnetic lock or an electronically-controlled mechanical lock, and, when causing the safe deposit box to be unlocked, the verification platform may cause the electromagnetic lock or the electronically-controlled mechanical lock to be disengaged.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for utilizing a short-range wireless communication device to provide keyless access to a safe deposit box. In some implementations, one or more process blocks of FIG. 5 may be performed by a verification platform (e.g., verification platform 220). In some implementations, one or more process blocks of FIG. 5 may be performed by another device or a group of devices separate from or including the verification platform, such as a user device (e.g., user device 210).

As shown in FIG. 5, process 500 may include receiving, from a short-range wireless communication device associated with a safe deposit box, first data identifying a first user device (block 510). For example, the verification platform (e.g., using computing resource 224, processor 320, communication interface 370, and/or the like) may receive, from a short-range wireless communication device associated with a safe deposit box, first data identifying a first user device, as described above in connection with FIGS. 1A-2.

As further shown in FIG. 5, process 500 may include identifying a first user associated with the first data (block 520). For example, the verification platform (e.g., using computing resource 224, processor 320, memory 330, and/or the like) may identify a first user associated with the first data, as described above in connection with FIGS. 1A-2.

As further shown in FIG. 5, process 500 may include determining whether the first user is authorized to access the safe deposit box (block 530). For example, the verification platform (e.g., using computing resource 224, processor 320, storage component 340, and/or the like) may determine whether the first user is authorized to access the safe deposit box, as described above in connection with FIGS. 1A-2.

As further shown in FIG. 5, process 500 may include starting a timer when the first user is authorized to access the safe deposit box (block 540). For example, the verification platform (e.g., using computing resource 224, processor 320, memory 330, and/or the like) may start a timer when the first user is authorized to access the safe deposit box, as described above in connection with FIGS. 1A-2.

As further shown in FIG. 5, process 500 may include receiving, from the short-range wireless communication device, second data identifying a second user device (block 550). For example, the verification platform (e.g., using computing resource 224, processor 320, communication interface 370, and/or the like) may receive, from the short-range wireless communication device, second data identifying a second user device, as described above in connection with FIGS. 1A-2.

As further shown in FIG. 5, process 500 may include determining whether the second data is received prior to an expiration of the timer (block 560). For example, the verification platform (e.g., using computing resource 224, processor 320, storage component 340, and/or the like) may determine whether the second data is received prior to an expiration of the timer, as described above in connection with FIGS. 1A-2.

As further shown in FIG. 5, process 500 may include identifying a second user associated with the second data when the second data is received prior to the expiration of the timer (block 570). For example, the verification platform (e.g., using computing resource 224, processor 320, memory 330, and/or the like) may identify a second user associated with the second data when the second data is received prior to the expiration of the timer, as described above in connection with FIGS. 1A-2.

As further shown in FIG. 5, process 500 may include determining whether the second user is authorized to access the safe deposit box (block 580). For example, the verification platform (e.g., using computing resource 224, processor 320, storage component 340, and/or the like) may determine whether the second user is authorized to access the safe deposit box, as described above in connection with FIGS. 1A-2.

As further shown in FIG. 5, process 500 may include causing the safe deposit box to be unlocked when the second user is authorized to access the safe deposit box (block 590). For example, the verification platform (e.g., using computing resource 224, processor 320, communication interface 370, and/or the like) may cause the safe deposit box to be unlocked when the second user is authorized to access the safe deposit box, as described above in connection with FIGS. 1A-2.

Process 500 may include additional implementations, such as any single implementation or any combination of implementations described below and/or described with regard to any other process described herein.

In some implementations, the verification platform may provide a rejection notification to a third user device associated with a supervisor of the first user when the first user is not authorized to access the safe deposit box. In some implementations, the verification platform may provide, to the first user device associated with the first user and the second user device associated with the second user, a notification indicating the expiration of the timer and requesting the first data again, where the notification is provided when the second data is received after the expiration of the timer.

In some implementations, the verification platform may determine, based on causing the safe deposit box to be unlocked, whether one or more additional users are associated with the safe deposit box, and may obtain, when the one or more additional users are determined to be associated with the safe deposit box, information identifying the one or more additional users, the one or more additional users being identified based on information identifying the safe deposit box. Additionally, the verification platform may identify, based on identifying the one or more additional users associated with the safe deposit box, one or more user devices associated with the one or more additional users, and may provide, to each user device of the one or more user devices associated with the one or more additional users, a notification indicating that the second user is accessing the safe deposit box.

In some implementations, the verification platform may determine, based on determining that the second user is authorized to access the safe deposit box and before causing the safe deposit box to be unlocked, whether one or more additional users are associated with the safe deposit box, and may obtain, when the one or more additional users are determined to be associated with the safe deposit box, information identifying the one or more additional users, the one or more additional users being identified based on information identifying the safe deposit box. Additionally, the verification platform may identify, based on identifying the one or more additional users associated with the safe deposit box, one or more user devices associated with the one or more additional users, and may provide, to each user device of the one or more user devices associated with the one or more additional users, a request to permit the second user to access the safe deposit box. Additionally, when causing the safe deposit box to be unlocked, the verification platform may cause the safe deposit box to be unlocked based on: determining that the second user is authorized to access the safe deposit box, and receiving permission, from each user device of the one or more user devices associated with the one or more additional users, for the second user to access the safe deposit box.

In some implementations, the short-range wireless communication device may include a near-field communication (NFC) device, a Bluetooth device, an infrared device, an ultraband device, or a Zigbee device. In some implementations, the safe deposit box may include one of an electromagnetic lock or an electronically-controlled mechanical lock, and, when causing the safe deposit box to be unlocked, the verification platform may cause the electromagnetic lock or the electronically-controlled mechanical lock to be disengaged.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for utilizing a short-range wireless communication device to provide keyless access to a safe deposit box. In some implementations, one or more process blocks of FIG. 6 may be performed by a verification platform (e.g., verification platform 220). In some implementations, one or more process blocks of FIG. 6 may be performed by another device or a group of devices separate from or including the verification platform, such as a user device (e.g., user device 210).

As shown in FIG. 6, process 600 may include receiving, from a short-range wireless communication device associated with a safe deposit box, first data identifying a first transaction card or a first user device (block 610). For example, the verification platform (e.g., using computing resource 224, processor 320, communication interface 370, and/or the like) may receive, from a short-range wireless communication device associated with a safe deposit box, first data identifying a first transaction card or a first user device, as described above in connection with FIGS. 1A-2.

As further shown in FIG. 6, process 600 may include identifying a first user associated with the first data (block 620). For example, the verification platform (e.g., using computing resource 224, processor 320, memory 330, and/or the like) may identify a first user associated with the first data, as described above in connection with FIGS. 1A-2.

As further shown in FIG. 6, process 600 may include determining whether the first user is authorized to access the safe deposit box (block 630). For example, the verification platform (e.g., using computing resource 224, processor 320, storage component 340, and/or the like) may determine whether the first user is authorized to access the safe deposit box, as described above in connection with FIGS. 1A-2.

As further shown in FIG. 6, process 600 may include starting a timer when the first user is authorized to access the safe deposit box (block 640). For example, the verification platform (e.g., using computing resource 224, processor 320, memory 330, and/or the like) may start a timer when the first user is authorized to access the safe deposit box, as described above in connection with FIGS. 1A-2.

As further shown in FIG. 6, process 600 may include receiving, from the short-range wireless communication device, second data identifying a second transaction card or a second user device (block 650). For example, the verification platform (e.g., using computing resource 224, processor 320, communication interface 370, and/or the like) may receive, from the short-range wireless communication device, second data identifying a second transaction card or a second user device, as described above in connection with FIGS. 1A-2.

As further shown in FIG. 6, process 600 may include determining whether the second data is received prior to an expiration of the timer (block 660). For example, the verification platform (e.g., using computing resource 224, processor 320, storage component 340, and/or the like) may determine whether the second data is received prior to an expiration of the timer, as described above in connection with FIGS. 1A-2.

As further shown in FIG. 6, process 600 may include identifying a second user associated with the second data when the second data is received prior to the expiration of the timer (block 670). For example, the verification platform (e.g., using computing resource 224, processor 320, memory 330, and/or the like) may identify a second user associated with the second data when the second data is received prior to the expiration of the timer, as described above in connection with FIGS. 1A-2.

As further shown in FIG. 6, process 600 may include determining whether the second user is authorized to access the safe deposit box (block 680). For example, the verification platform (e.g., using computing resource 224, processor 320, storage component 340, and/or the like) may determine whether the second user is authorized to access the safe deposit box, as described above in connection with FIGS. 1A-2.

As further shown in FIG. 6, process 600 may include causing the safe deposit box to be unlocked when the second user is authorized to access the safe deposit box (block 690). For example, the verification platform (e.g., using computing resource 224, processor 320, memory 330, communication interface 370, and/or the like) may cause the safe deposit box to be unlocked when the second user is authorized to access the safe deposit box, as described above in connection with FIGS. 1A-2.

Process 600 may include additional implementations, such as any single implementation or any combination of implementations described below and/or described with regard to any other process described herein.

In some implementations, the verification platform may provide a rejection notification to a third user device and/or to the short-range wireless communication device when the first user is not authorized to access the safe deposit box, where the third user device is associated with a supervisor of the first user.

In some implementations, the verification platform may provide, to the first user device associated with the first user and the second user device associated with the second user, a notification indicating the expiration of the timer and requesting the first data again, where the notification is provided when the second data is received after the expiration of the timer.

In some implementations, the verification platform may determine, based on causing the safe deposit box to be unlocked, whether one or more additional users are associated with the safe deposit box, and may obtain, when the one or more additional users are determined to be associated with the safe deposit box, information identifying the one or more additional users, the one or more additional users being identified based on information identifying the safe deposit box. Additionally, the verification platform may identify, based on identifying the one or more additional users associated with the safe deposit box, one or more user devices associated with the one or more additional users, and may provide, to each user device of the one or more user devices associated with the one or more additional users, a notification indicating that the second user is accessing the safe deposit box.

In some implementations, the verification platform may determine, based on determining that the second user is authorized to access the safe deposit box and before causing the safe deposit box to be unlocked, whether one or more additional users are associated with the safe deposit box, and may obtain, when the one or more additional users are determined to be associated with the safe deposit box, information identifying the one or more additional users, the one or more additional users being identified based on information identifying the safe deposit box. Additionally, the verification platform may identify, based on identifying the one or more additional users associated with the safe deposit box, one or more user devices associated with the one or more additional users, and may provide, to each user device of the one or more user devices associated with the one or more additional users, a request to permit the second user to access the safe deposit box. Additionally, when causing the safe deposit box to be unlocked, the verification platform may cause the safe deposit box to be unlocked based on: determining that the second user is authorized to access the safe deposit box, and receiving permission, from one or more of the one or more user devices associated with the one or more additional users, for the second user to access the safe deposit box. In some implementations, the safe deposit box may include one of an electromagnetic lock or an electronically-controlled mechanical lock.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a short-range wireless communication device associated with a secured location, first data,
      the first data identifying a transaction card, and
      the secured location being associated with a lock;
   receiving, by the short-range wireless communication device and based on the first data, first authorization data indicating whether access to the secured location is authorized,
      the first authorization data being received from a verification platform, and
      a timer being started when the first authorization data indicates that access to the secured location is authorized based on the first data;
   receiving, by the short-range wireless communication device, second data,
      the second data identifying a user device;
   receiving, by the short-range wireless communication device, based on the timer being started, and based on the second data, second authorization data indicating whether access to the secured location is authorized,
      the second authorization data being received from the verification platform;
   determining, by the short-range wireless communication device and based on the first authorization data and the second authorization data, that access to the secured location is authorized; and
   causing, by the short-range wireless communication device, the lock to be unlocked.

2. The method of claim 1, further comprising:
   causing a display device, associated with the short-range wireless communication device, to display a notification indicating that the lock is unlocked.

3. The method of claim 1, wherein the short-range wireless communication device includes at least one of:
   a near-field communication (NFC) device,
   a Bluetooth device,
   an infrared device,
   an ultraband device, or
   a Zigbee device.

4. The method of claim 1, wherein the first data is received via a first wireless communication protocol, and the second data is received via a second wireless communication protocol different from the first wireless communication protocol.

5. The method of claim 1, wherein determining, based on the first authorization data and the second authorization data, that access to the secured location is authorized comprises:
   determining, based on a measure of time between the timer being started and receiving the second data, that access to the secured location is authorized.

6. The method of claim 1, further comprising:
   providing, to the user device and based on the second data, data indicating that access to the secured location is authorized.

7. The method of claim 1, further comprising:
   providing, to an authorization platform, data identifying the secured location associated with the short-range wireless communication device.

8. A short-range wireless communication device, comprising:
   one or more memories; and
   one or more processors communicatively coupled to the one or more memories, configured to:
      receive first data,
         the first data identifying a user device;
      receive, based on the first data, first authorization data indicating whether access to a secured location, associated with the short-range wireless communication device and associated with a lock, is authorized,
         the first authorization data being received from a verification platform, and
         a timer being started when the first authorization data indicates that access to the secured location is authorized based on the first data;
      receive second data,
         the second data identifying a transaction card;
      receive, based on the timer being started and based on the second data, second authorization data indicating whether access to the secured location is authorized,
         the second authorization data being received from the verification platform;
      determine, based on the first authorization data and the second authorization data, that access to the secured location is authorized; and
      cause the lock to be unlocked.

9. The short-range wireless communication device of claim 8, wherein the one or more processors are further configured to:
   cause a display device, associated with the short-range wireless communication device, to display a notification indicating that the lock is unlocked.

10. The short-range wireless communication device of claim 8, wherein the short-range wireless communication device includes at least one of:
    a near-field communication (NFC) device,
    a Bluetooth device,
    an infrared device,
    an ultraband device, or
    a Zigbee device.

11. The short-range wireless communication device of claim 8, wherein the first data is received via a first near-field communication (NFC) protocol, and the second data is received via a second NFC protocol.

12. The short-range wireless communication device of claim 8, wherein the one or more processors, when determining, based on the first authorization data and the second authorization data, that access to the secured location is authorized, are configured to:
  determine, based on a measure of time between the timer being started and receiving the second data, that access to the secured location is authorized.

13. The short-range wireless communication device of claim 8, wherein the one or more processors are further configured to:
  provide, to the user device and based on the second data, data indicating that access to the secured location is authorized.

14. The short-range wireless communication device of claim 8, wherein the one or more processors are further configured to:
  provide, to an authorization platform, data identifying the secured location associated with the short-range wireless communication device.

15. A non-transitory computer-readable medium storing instructions, the instructions comprising:
  one or more instructions that, when executed by one or more processors of a short-range wireless communication device, cause the one or more processors to:
    receive first data,
      the first data identifying a first transaction card or a first user device;
    receive, based on the first data, first authorization data indicating whether access to a secured location, associated with the short-range wireless communication device and associated with a lock, is authorized,
      the first authorization data being received from a verification platform, and
      a timer being started when the first authorization data indicates that access to the secure location is authorized based on the first data;
    receive second data,
      the second data identifying a second transaction card that is different from the first transaction card, or a second user device that is different from the first user device;
    receive, based on the timer being started and based on the second data, second authorization data indicating whether access to the secured location is authorized, the second authorization data being received from the verification platform;
    determine, based on the first authorization data and the second authorization data, that access to the secured location is authorized; and
    cause the lock to be unlocked.

16. The non-transitory computer-readable medium of claim 15, wherein the one or more instructions, when executed by the one or more processors, further cause the one or more processors to:
  cause a display device, associated with the short-range wireless communication device, to display a notification indicating that the lock is unlocked.

17. The non-transitory computer-readable medium of claim 15, wherein the short-range wireless communication device includes at least one of:
  a near-field communication (NFC) device,
  a Bluetooth device,
  an infrared device,
  an ultraband device, or
  a Zigbee device.

18. The non-transitory computer-readable medium of claim 15, wherein the one or more instructions, that cause the one or more processors to determine, based on the first authorization data and the second authorization data, that access to the secured location is authorized, cause the one or more processors to:
  determine, based on a measure of time between the timer being started and receiving the second data, that access to the secured location is authorized.

19. The non-transitory computer-readable medium of claim 15, wherein:
  the first data identifies the first transaction card, and
  the second data identifies the second user device.

20. The non-transitory computer-readable medium of claim 15, wherein the one or more instructions, when executed by the one or more processors, further cause the one or more processors to:
  provide, to the second user device and based on the second data, data indicating that access to the secured location is authorized.

* * * * *